United States Patent [19]
Hall

[11] Patent Number: 5,873,295
[45] Date of Patent: Feb. 23, 1999

[54] CUTTING GUIDE

[76] Inventor: Thomas David Hall, 7219 Burtcliff Dr., Baton Rouge, La. 70818

[21] Appl. No.: 880,602

[22] Filed: Jun. 23, 1997

Related U.S. Application Data

[63] Continuation-in-part of Ser. No. 670,401, Jun. 25, 1996, abandoned.

[51] Int. Cl.$^6$ ........................................................ B26D 1/54
[52] U.S. Cl. .............................. 83/820; 83/651.1; 83/745; 30/92; 30/116; 30/282
[58] Field of Search ................................. 83/820, 745, 54, 83/651.1; 30/92, 166.3, 115, 116, 282, 290, 380

[56] References Cited

U.S. PATENT DOCUMENTS

| | | | |
|---|---|---|---|
| 13,040 | 11/1855 | Freese | 83/745 |
| 308,187 | 11/1884 | Miller | 83/745 |
| 470,779 | 3/1892 | Calef | 30/166.3 |
| 1,630,759 | 5/1927 | Pierce, Jr. | 83/54 |
| 1,796,212 | 3/1931 | Nadeo | 30/116 |
| 1,864,921 | 6/1932 | Mayer | 30/116 |
| 2,120,114 | 6/1938 | Patton | 30/92 |
| 2,617,452 | 11/1952 | Dowling, Sr. | 83/745 |
| 3,965,571 | 6/1976 | Lyman | 30/92 |
| 3,999,294 | 12/1976 | Shoben | 30/166.3 |
| 4,464,836 | 8/1984 | Hissa | 30/166.3 |
| 5,179,781 | 1/1993 | Weaver | 30/92 |
| 5,199,221 | 4/1993 | Hillestad | 83/54 |
| 5,611,146 | 3/1997 | Durcret | 30/92 |
| 5,632,089 | 5/1997 | Sakamoto et al. | 83/745 |

*Primary Examiner*—Rinaldi I. Rada
*Assistant Examiner*—Sean A. Pryor
*Attorney, Agent, or Firm*—Warner J. Delaune

[57] ABSTRACT

A cutting guide is provided, comprising a first clamping member having a first surface adapted to contact a pipe; a second clamping member having a second surface adapted to contact the pipe; a connecting device operatively disposed between the first clamping member and the second clamping member for connecting and urging the first and second clamping members toward one another to grip the pipe; and a cutting guide member, preferably a cylindrical member, attached to the second clamping member for slidably retaining and guiding a flexible cutting member in contact with the pipe. The first and second surfaces which contact the pipe are preferably contoured to approximate the shape of the pipe. Also preferably, the bottom surfaces of both the first and second clamping members are coplanar during operation of the cutting guide. Optionally, a recess is formed into the first clamping member which is adapted to receive a reducing member for contacting smaller sizes of pipe.

6 Claims, 5 Drawing Sheets

CUTTING GUIDE

RELATION TO APPLICATION

This application is a continuation-in-part of U.S. Ser. No. 08/670,401, filed on Jun. 25, 1996, now abandoned.

BACKGROUND OF THE INVENTION

I. Field of the Invention

The present invention relates generally to devices for cutting pipe, and more particularly to devices which attach to the pipe and guide a flexible cutting member.

II. Description of Prior Art

In the construction industry, there are many occasions when one must cut sections of pipe which are located in areas that are quite difficult to access. This is especially a problem when the section of pipe to be cut protrudes from a fixed surface, such as a concrete base. The most common type of pipe encountered in these situations are pipes constructed of polyvinyl chloride (PVC), which are used extensively in plumbing applications. PVC pipes which are located in these hard-to-reach areas are typically cut using a flexible cutting member, such as a wire or nylon string having handles. The cutting member is held with one handle in each hand, and the wire is placed around the pipe. The worker then moves the wire back and forth in a reciprocating, saw-like fashion until the wire begins to cut the pipe. This action is maintained until the pipe is completely cut.

There are a number of disadvantages to cutting the pipe in this manner. First, because the pipe is located in a difficult area to reach, the cut may not be uniform and it may cross the pipe in a plane which is not perpendicular to the longitudinal axis of the pipe. Cuts which are not perpendicular present a constant problem for the subsequent attachment of connectors and other fittings. Second, without a guide for the cutting action, much effort is expended by the worker in trying to keep the cutting line along the proper plane, often without much success. This can lead to poor quality work, frustration by the worker, and loss of productivity. Finally, prior methods of cutting the pipe cannot ensure that a consistent height of the exposed pipe is maintained above the surface from which the pipe extends. It would be advantageous for each cut to result in a predetermined height of exposed pipe above the surface so that a dependable portion of pipe is maintained for the assembly of fittings and connectors.

SUMMARY OF THE INVENTION

It is therefore an object of this invention to provide a cutting guide for pipe that allows the pipe to be cut in a plane perpendicular to the axis of the pipe.

It is also an object of this invention to provide a cutting guide for pipe that can be seated on any fixed surface from which the pipe protrudes so that a convenient and consistent exposed length can be created.

It is a further object of this invention to provide a cutting guide for pipe that requires a minimum of operating space to cut the pipe.

Yet another object of this invention is to provide a cutting guide for pipe that is simple, reliable and inexpensive to use.

These and other objects and advantages of the present invention will no doubt become apparent to those skilled in the art after having read the following description of the preferred embodiment which are contained in and illustrated by the various drawing figures.

Therefore, in a preferred embodiment, a cutting guide is provided, comprising a first clamping member having a first surface adapted to contact a pipe; a second clamping member having a second surface adapted to contact the pipe; a connecting device operatively disposed between the first clamping member and the second clamping member for connecting and urging the first and second clamping members toward one another to grip the pipe; and a cutting guide member, preferably a cylindrical member, attached to the second clamping member for slidably retaining and guiding a flexible cutting member in contact with the pipe. The first and second surfaces which contact the pipe are preferably contoured to approximate the shape of the pipe. Also preferably, the bottom surfaces of both the first and second clamping members are coplanar during operation of the cutting guide. Optionally, a recess is formed into the first clamping member which is adapted to receive a reducing member for contacting smaller sizes of pipe.

In an alternative embodiment, the second clamping member comprises a base connectable to the first clamping member; and a guide member lockably connectable to the base, wherein the cylindrical member is attached to the guide member.

DETAILED DESCRIPTION OF THE PREFERRED EMBODIMENTS

Figure 1:
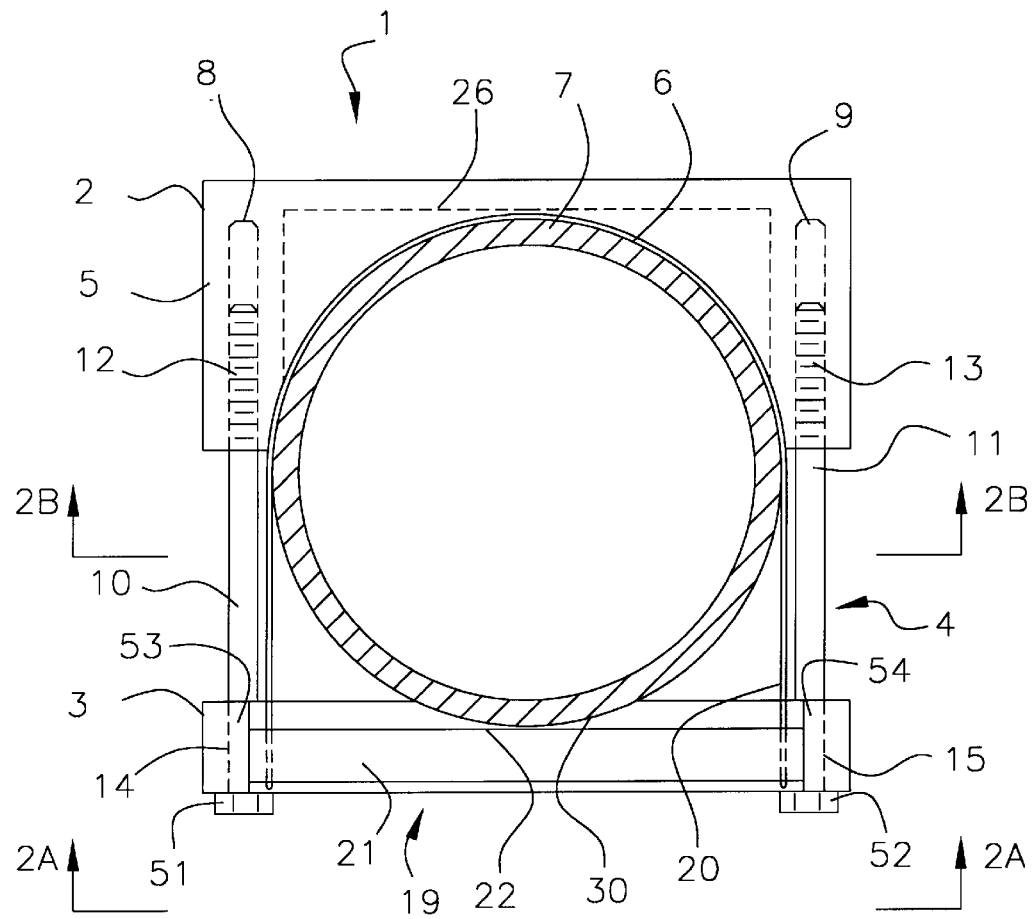
FIG. 1 is a top view of a preferred embodiment of the present invention in operation.

In the drawings, certain details pertaining to fabrication and maintenance utility well established in the machine construction art and not bearing upon points of novelty are omitted in the interest of descriptive clarity and efficiency. Such details may include threaded connections, lockrings, shear pins, weld lines and the like. Furthermore, unless otherwise stated, all components of the invention are preferably constructed of metal, such as aluminum, steel or stainless steel.

Turning now to FIG. 1, a preferred embodiment 1 of the cutting guide is shown to generally comprise a first clamping member 2, a second clamping member 3 and connecting means 4. First clamping member 2 includes a body portion 5 having a first surface 6 which is adapted to contact the pipe 7 which is to be cut. While the ideal shape of first surface 6 should be contoured to approximate the external surface of the pipe 7, this is not a critical condition for successful operation of the invention. For example, first surface 6 may alternatively include a plurality of points which slightly deform and grip the pipe 7. As best shown in FIG. 1, the body 5 of first clamping member 2 also includes two threaded holes 8,9 which accept the threaded ends 12,13 of studs 10,11, respectively. Studs 10,11 are also attached to the second clamping member 3 through holes 14,15 formed therethrough. Second clamping member 3 may be secured to first clamping member 2 and drawn thereto by tightening nuts 51,52 onto the threaded ends 53,54 of studs 10,11 once the cutting guide 1 is in proper position. One of ordinary skill in the art will appreciate that while studs 10,11 are shown, such studs are merely one example of a wide variety of connecting means 4 which may be used to urge first clamping member 2 toward second clamping member 3. For example, fixed studs (not shown) having threaded ends and extending from first clamping member 2 can be substituted for studs 10,11. If fixed studs are used, captive fastening hardware can be attached to second clamping member 3 in holes 14,15 to secure second clamping member 3 to first clamping member 2.

Second clamping member 3 includes a body portion 16 having a second surface 30 similar in function to the first surface 6 of the first clamping member 2, as well as a pair of support posts 17,18 extending therefrom. The purpose of support posts 17,18 is to hold guiding means 19, which is used to slidably retain and guide a flexible cutting member 20 during the cutting of the pipe 7. In a preferred embodiment, guiding means 19 is a cylindrical member 21 which is held in a fixed position by common fasteners or by welding between support posts 17,18. In most cases, flexible cutting member 20 is either a nylon string or a metal wire or cable. Because of the frictional contact that will exist between the flexible cutting member 20 and the cylindrical member 21 during the cutting operation, the external surface of cylindrical member 21 must be smooth and highly wear resistant. Consequently, it is preferred that the cylindrical member 21 be constructed of stainless steel. Cylindrical member 21 is spaced apart from body portion 16 by gap G so that the flexible cutting member 20, with any attached handles, may be easily passed therethrough before and after the cutting operation. As can be seen in FIG. 1, the cylindrical member 21 is located on second clamping member 3 such that the inside edge 22 of the cylindrical member 21 is immediately adjacent to the pipe 7. This arrangement is necessary, because it allows the cutting guide 1 to achieve its goal of using the minimum operating space, as well as giving the worker the maximum amount of length for the cutting member 20.

Figure 3:
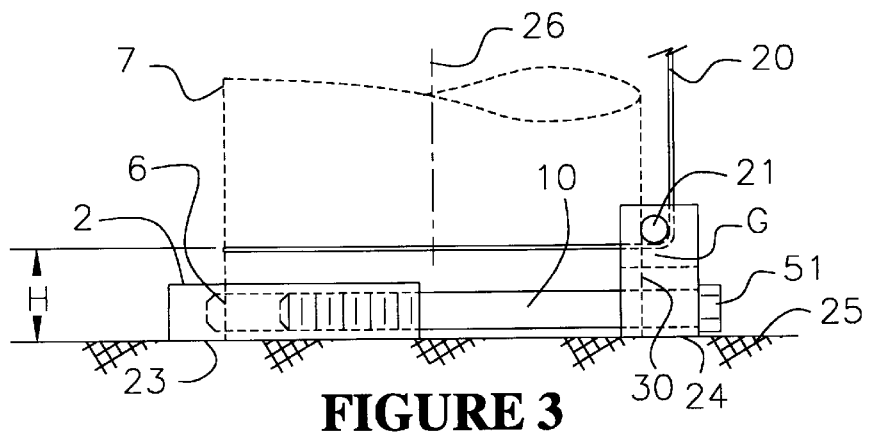
FIG. 3 is a side elevation view of the invention of FIG. 1.

Another important aspect of the preferred embodiment is that the bottom surface 23 of the first clamping member 2 and the bottom surface 24 of the second clamping member 3 are coplanar, shown best in FIG. 3. This arrangement allows the cutting guide 1 to be placed in a stable position on whatever fixed surface 25 from which the pipe 7 is extending, which ensures that a cut will be made that is perpendicular to the longitudinal axis 26 of the pipe 7. Another advantage of the coplanar bottom surfaces 23,24 is that a consistent length of protruding pipe 7 can be exposed for connectors and other conduits by always cutting at a height H from the fixed surface 25.

Figure 2A:
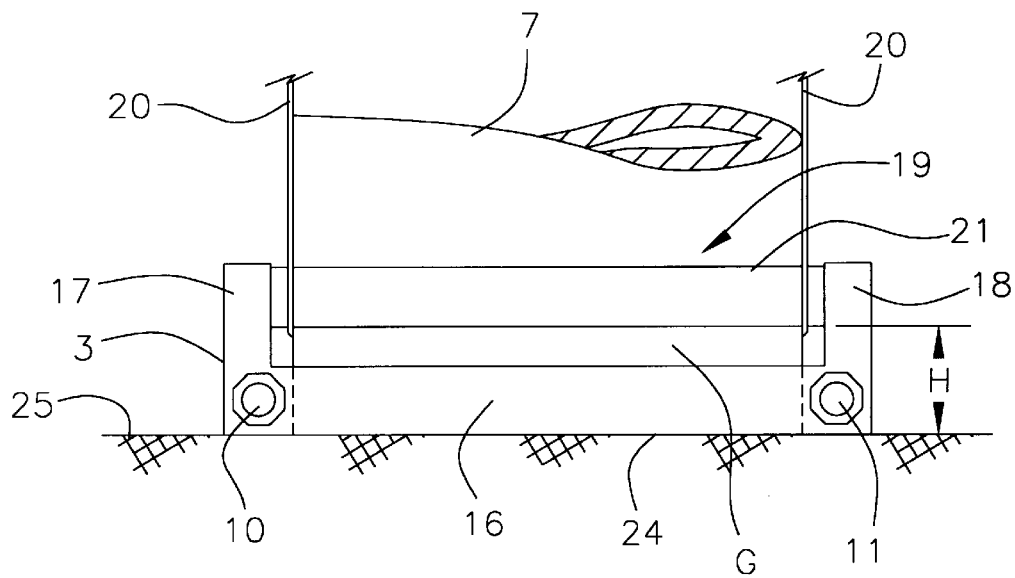
FIG. 2A is a front elevation view of the invention of FIG. 1.
Figure 2B:
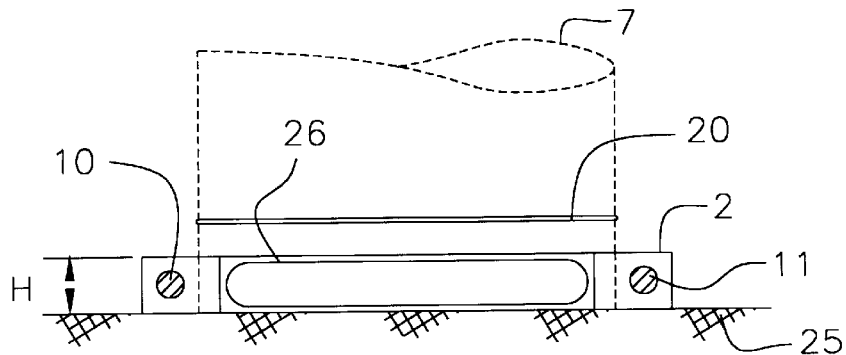
FIG. 2B is a sectional view of the invention of FIG. 1 taken along Section 2B.
Figure 4:
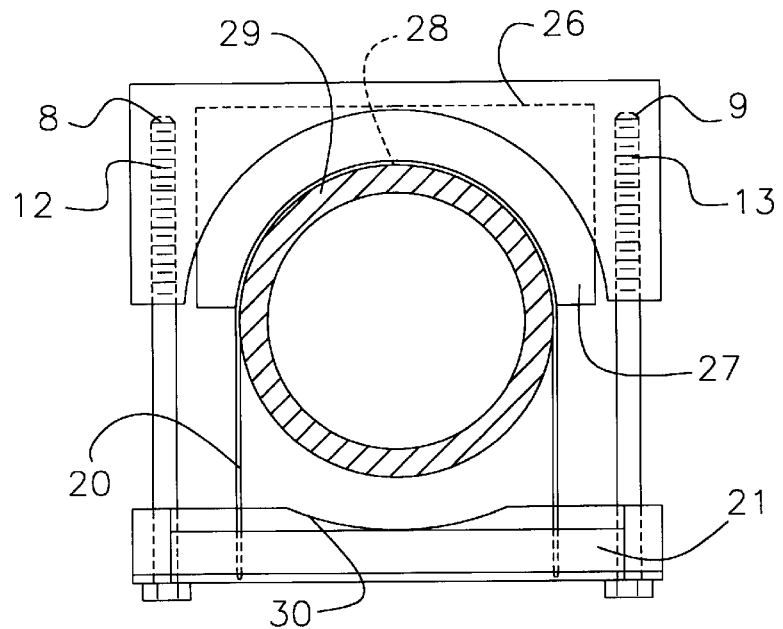
FIG. 4 is a top view of the invention of FIG. 1 with the reducing member installed and in operation.

Although the embodiment of FIG. 1 can be employed for pipes having smaller diameters than that shown in FIG. 1, there are times when a closer fit is desired between the cutting guide 1 and the pipe 7. Consequently, a recess 26 is formed into the body 5 of first clamping member 2, shown best in FIGS. 2B and 4, which accommodates a reducing member 27. Reducing member 27 is simply a block having an internal surface 28 which is adapted to contact the external surfaces of smaller pipes 29.

Figure 5:
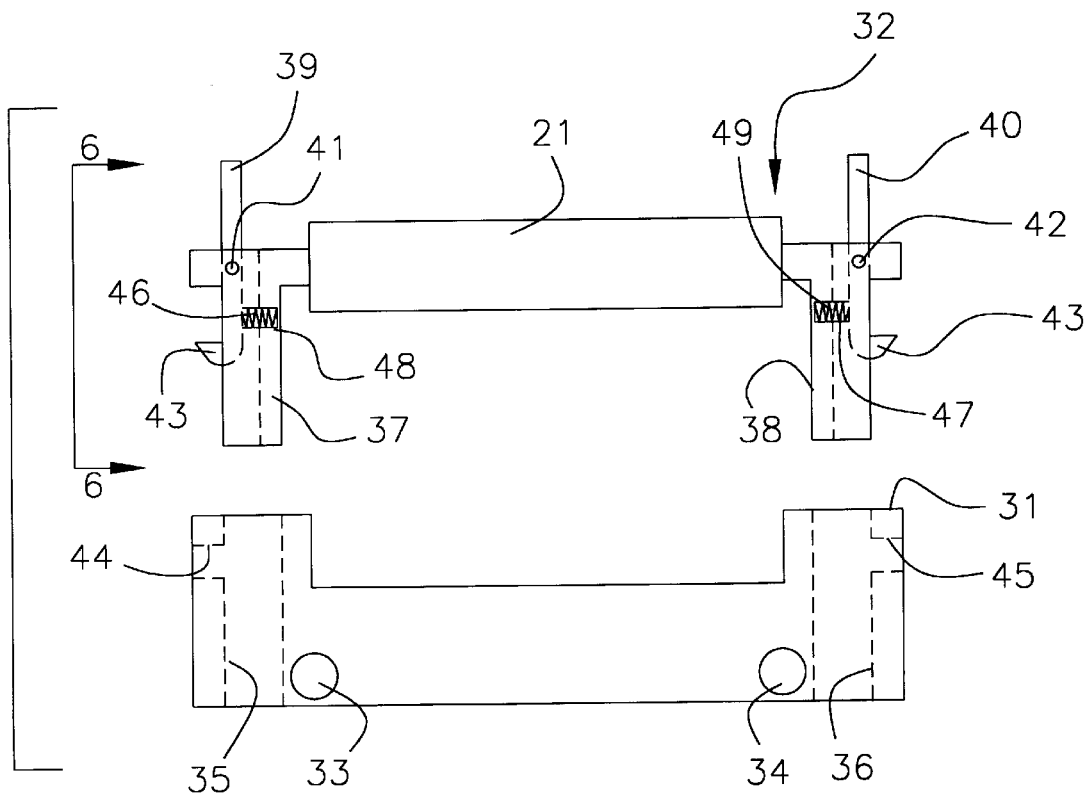
FIG. 5 is a front elevation view of an alternative embodiment of the second clamping member which includes a removable guide member.
Figure 6:
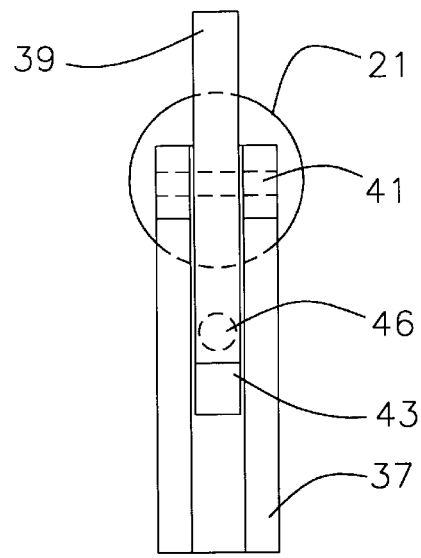
FIG. 6 is a side elevation view of the embodiment of FIG. 5 taken along Section 6.

An alternative embodiment of the second clamping member 3 is shown in FIG. 5 which includes a base 31 that allows removability of a guide member 32. Base 31 includes a pair of holes 33,34 which are analogous to holes 14,15 of the embodiment of FIG. 1. Passageways 35,36 are formed into base 31 which accept tabs 37,38 located on guide member 32. Guide member 32 also includes a cylindrical member 21 which is identical in both structure and function to its counterpart in the preferred embodiment. Tabs 37,38 are lockably held within passageways 35,36 by spring-loaded latches 39,40 which pivot on either side of guide member 32. Latches 39,40 are retained by pins 41,42 press fit within holes in guide member 32. The hook portion 43 of each latch is biased into mating engagement with slots 44,45 by compression springs 46,47 seated within pockets 48,49 formed into tabs 37,38. When it is desired to remove guide member 32 from base 31, latches 39,40 are pressed to disengage the tabs 37,38 from passageways 35,36.

Figure 7:
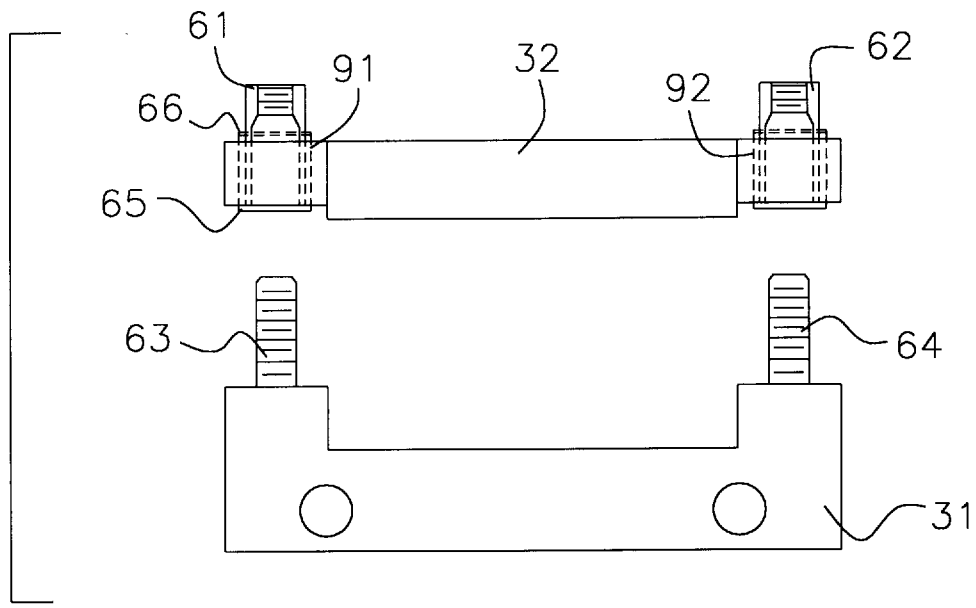
FIG. 7 is a front elevation view of another alternative embodiment of a removable guide member employing threaded bushings.

A further alternative embodiment of the second clamping member 3 is shown in FIG. 7, wherein the guide member 32 is removably attached to the base 31 by a pair of captive nuts 61,62. Captive nuts 61,62 are internally threaded and mate with corresponding studs 63,64 which extend from the base 31. Each of the captive nuts 61,62 are positioned within passageways 91,92 formed into guide member 32, and they are prevented from separating from guide member 32 by a lip 65 formed as a part of each captive nut, as well as by a lock ring 66 snapped into a groove (not shown) formed circumferentially around the captive nut. This arrangement allows each captive nut 61,62 to be rotated independently within guide member 32 so that guide member 32 can easily be attached and detached from base 31 during use.

Figure 8:
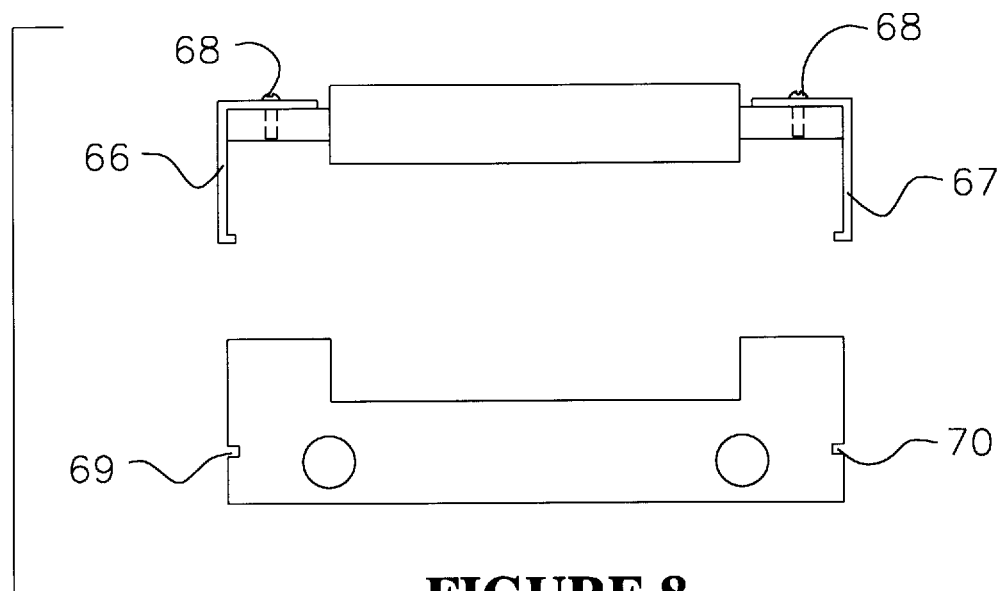
FIG. 8 is a front elevation view of another alternative embodiment of a removable guide member employing spring clips.

FIG. 8 depicts yet another alternative embodiment of a removable guide member 32 through the use of resiliently biased clips 66,67 attached to the ends of guide member 32. In a preferred assembly, clips 66,67 are constructed from a strong spring steel or other suitably stiff and elastic metal and are attached to guide member 32 by a screw 68 or other similar hardware. A pair of grooves 69,70 are formed into base 31 to receive the ends of clips 66,67, thereby allowing guide member 32 to be securely connected to the base 31. Guide member 32 can be removed from the base 31 by simply prying the clips 66,67 from the base 31.

Figure 9:
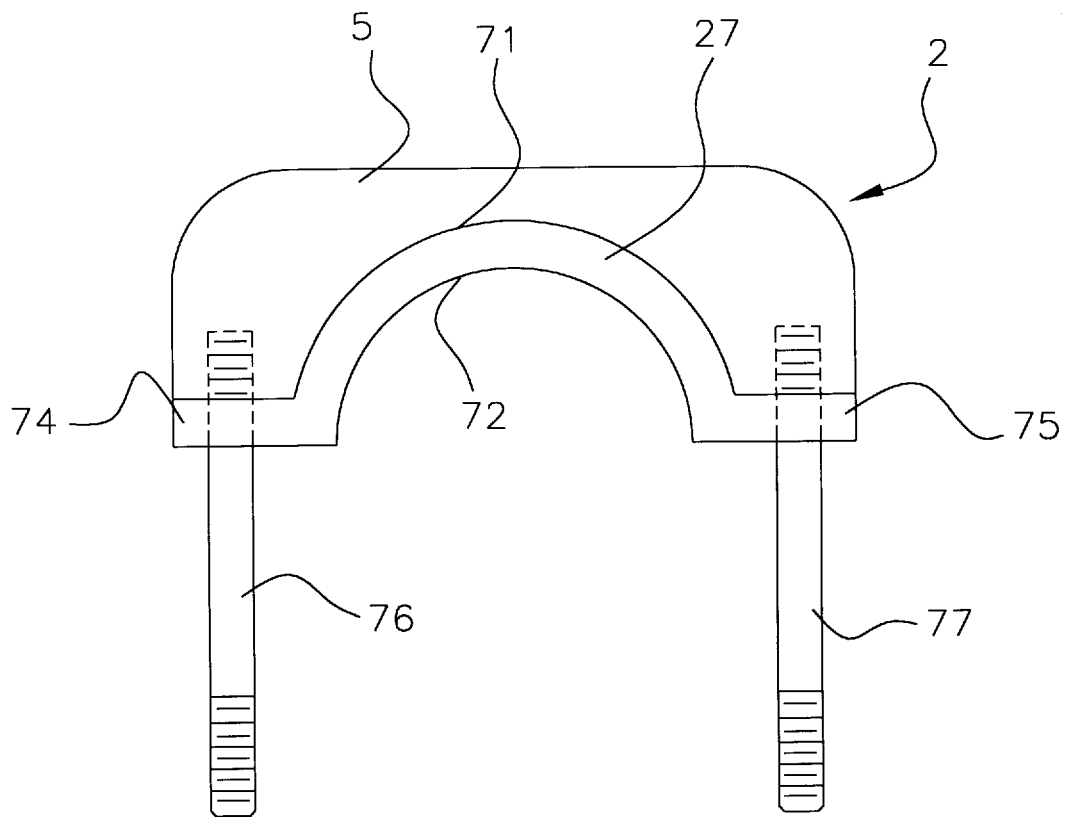
FIG. 9 is a top view depicting an alternative embodiment of the reducing member.

FIG. 9 further shows an alternative embodiment of the first clamping member 2 and the reducing member 27. The body 5 of the first clamping member 2 is shaped to accommodate larger pipe diameters, while the reducing member 27 allows for the cutting of smaller pipes. Reducing member 27 is U-shaped so that its upper side 71 conforms to the body 5 of the first clamping member 2, while its lower side 72 more closely approximates the shape of the pipe to be cut. Reducing member 27 further includes terminal ends 74,75 which matably engage the pair of fixed studs 76,77 extending from first clamping member 2, wherein such terminal ends 74,75 may include holes or U-shaped ends.

Figure 10:
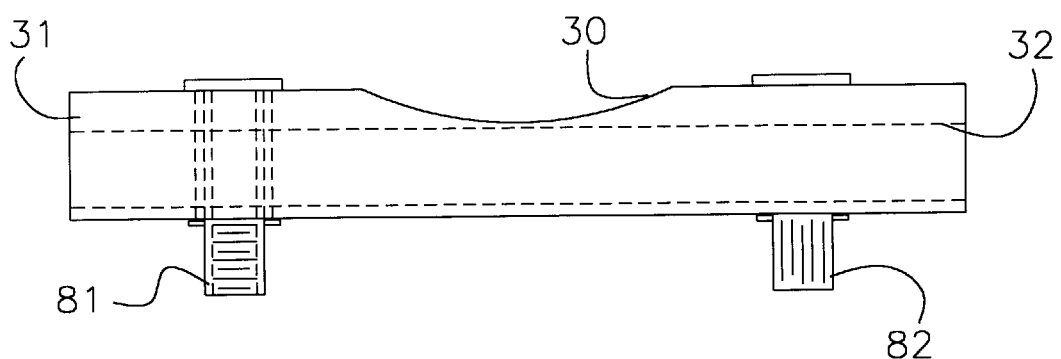
FIG. 10 is a top view depicting an alternative means of connecting the second clamping member to the first clamping member employing threaded bushings.

Finally, FIG. 10 depicts an alternative embodiment of the base 31 which employs captive nuts 81,82 identical in structure and function to the captive nuts 61,62 described earlier with respect to the guide member 32. In this figure, a top view is shown, and the guide member 32 is shown in phantom lines for reasons of clarity. As can be seen, the captive nuts 80,81 are free to rotate so that the base 31 can be attached to the studs 76,77. Because captive nuts 81,82 do not have closed ends, the studs 76,77 can extend past the captive nuts 81,82 on smaller pipe sizes. Preferably, captive nuts 81,82 include a knurled or faceted exterior so that they can be easily hand-tightened and loosened during operation.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A device for cutting pipes, comprising:
   (a) a first clamping member having a first surface adapted to contact a pipe;
   (b) a second clamping member having a second surface adapted to contact said pipe, wherein said first and second surfaces of said first and second clamping members, respectively, face one another and contact said pipe in substantially the same plane;
   (c) connecting means operatively disposed between said first clamping member and said second clamping member for connecting and urging said first and second clamping members toward one another to grip said pipe;
   guiding means attached to said second clamping member for establishing a cutting plane and enabling reciprocating action of a flexible cutting member in a direction that is non-coplanar to said cutting plane, said guiding means comprising a cylindrically shaped bar extending across said second clamping member; and
   (e) a flexible cutting member adapted to make conformable and circumferential contact with approximately half of said pipe on the side of said pipe contacted by said first clamping member, while said flexible cutting member is in slidable contact with said guiding means.

2. The cutting device of claim 1, wherein said first surface and said second surface are contoured to approximate the shape of said pipe.

3. The cutting device of claim 1, wherein said connecting means comprises a pair of studs extending from said first clamping member, and wherein said studs are positioned on either side of said pipe during operation of said cutting guide.

4. The cutting device of claim 1, wherein said first clamping member includes a first bottom surface and wherein said second clamping member includes a second bottom surface; and wherein said first and second bottom surfaces are substantially coplanar during operation of said cutting guide.

5. The cutting device of claim 1, wherein said first clamping member includes a recess adapted to receive a reducing member for contacting smaller sizes of said pipe.

6. The cutting device of claim 1, wherein said second clamping member comprises a base connectable to said first clamping member; and wherein said guiding member is removably and lockably connectable to said base.

\* \* \* \* \*